US008793200B1

(12) United States Patent
Chen et al.

(10) Patent No.: US 8,793,200 B1
(45) Date of Patent: Jul. 29, 2014

(54) METHOD FOR PARTICLE SWARM OPTIMIZATION WITH RANDOM WALK

(75) Inventors: Yang Chen, Westlake Village, CA (US); Yuri Owechko, Newbury Park, CA (US); Swarup Medasani, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 603 days.

(21) Appl. No.: 12/586,505

(22) Filed: Sep. 22, 2009

(51) Int. Cl.
*G06N 5/00* (2006.01)
(52) U.S. Cl.
CPC .................................. *G06N 5/003* (2013.01)
USPC ........................................................ 706/13
(58) Field of Classification Search
CPC ................................................... G06N 5/003
USPC ......................................................... 706/13
See application file for complete search history.

(56) References Cited

U.S. PATENT DOCUMENTS

| 7,558,762 B2 | 7/2009 | Owechko et al. |
| 7,672,911 B2 | 3/2010 | Owechko et al. |

OTHER PUBLICATIONS

Cui et al ("Particle swarm optimization with FUSS and RWS for high dimensional functions") Jun. 2008.*
Krohling et al (Coevolutionary Particle Swarm Optimization Using Gaussian Distribution for Solving Constrained Optimization Problems 2006).*
Mikki et al ("Physical Theory for Particle Swarm Optimization" 2007).*
Poli et al ("Particle swarm optimization an overview" 2007).*
Wachowiak et al ("An approach to multimodal biomedical image registration utilizing particle swarm optimization" 2004).*
Cagnoni et al ("Particle Swarm Optimization for Object Detection and Segmentation" 2007).*
Mahmoud et al ("A Comparison Between Circular and Hexagonal Array Geometries for Smart Antenna Systems Using Particle Swarm Optimization Algorithm" 2007).*
Ozcan et al ("Particle Swarms for Multimodal Optimization" 2007).*
Janson ("Molecular docking with multi-objective Particle Swarm Optimization" 2007).*
Khosla, D., Moore, C., and Chelian, S. (2007). A Bioinspired system for spatio-temporal recognition in static and video imagery. Proceedings of SPIE, 6560: 656002.
Judea Pearl, et al., "Bayesian Networks," Handbook of Brain Theory and Neural Networks, Technical Report, R-277, Nov. 2000.
Avrim Blum (1996), "On-Line Algorithms in Machine Learning", in Proceedings of the Workshop on On-Line Algorithms.
Notice of Allowability for U.S. Appl. No. 11/433,159.
Reply to Notice of Allowance for U.S. Appl. No. 11/433,159.

(Continued)

*Primary Examiner* — Lut Wong
(74) *Attorney, Agent, or Firm* — Tope-McKay & Associates

(57) ABSTRACT

Described is a method for particle swarm optimization (PSO) utilizing a random walk process. A plurality of software agents is configured to operate as a cooperative swarm to locate an optimum of an objective function. The method described herein comprises two phases. In a first phase, the plurality of software agents randomly explores the multi-dimensional solution space by undergoing a Brownian motion style random walk process. In a second phase, the velocity and position vectors for each particle are updated probabilistically according to a PSO algorithm. By allowing the particles to undergo a random walk phase, the particles have an increased opportunity to explore their neighborhood, land in the neighborhood of a true optimum, and avoid prematurely converging on a sub-optimum. The present invention improves on what is currently known by increasing the success rate of the PSO algorithm in addition to reducing the required computation.

21 Claims, 6 Drawing Sheets

(56) References Cited

OTHER PUBLICATIONS

Notice of Allowability for U.S. Appl. No. 10/918,336.
Notice of Allowability for U.S. Appl. No. 11/800,265.
Notice of Allowability for U.S. Appl. No. 11/367,755.
Notice of Allowability for U.S. Appl. No. 11/385,983.
D. Nister and H. Stewenius, "Scalable recognition with a vocabulary tree," in Proc. CVPR, vol. 5, 2006.
S. Medasani and R. Krishnapuram, "Graph Matching by Relaxation of fuzzy assignments," IEEE Transactions on Fuzzy Systems, 9(1), 173-183, Feb. 2001.
R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.
N. Oliver and A. Pentland, "Graphical models for driver behavior recognition in a smart car," Proc. of IV2000.
K. Sato and J.K. Aggarwal, "Temporal spatio-velocity transform and its application to tracking and interaction," CVIU 96(2004), 100-128.
S. Hongeng, R. Nevatia, and F. Bremond, "Video-based event recognition: activity representation and probabilistic recognition methods," CVIU 96(2004), 129-162.
Medioni, I. Cohen, F. Bremond, S. Hongeng, R. Nevatia, "Event detection and analysis from video streams," IEEE PAMI 23(8), 2001, 873-889.
N. Oliver, A. Garg, and E. Horvitz, "Layered representations for learning and inferring office activity from multiple sensory channels," CVIU 96(2004), 163-180.
A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.
R.T. Collins, A. J. Lipton, and T. Kanade, "Introduction to the special section on video surveillance," IEEE-PAMI, 22(8), Aug. 2000.
N. Oliver, B. Rosario, and a. Pentland, "A Bayesian computer vision system for moceling human interactions," IEEE-PAMI, 22(8), Aug. 2000.
J.C. Bezdek, Pattern Recognition with Fuzzy Objective Function Algorithms, Plenum Press, New York, 1981.
M.P. Windham, "Numerical classification of proximity data with assignment measure," Journal of Classification, vol. 2, pp. 157-172, 1985.
S. Gold and A. Rangarajan, "A graduated assignment algorithm for graph matching," IEEE Transaction on Pattern Analysis and Machine Intelligence, vol. 18, pp. 377-387, Apr. 1996.
Z. Zhang, "A flexible new technique for camera calibration," IEEE Transactions on Pattern Analysis and Machine Intelligence, 22(11): 1330-1334, 2000.
Jean-Yves Bouguet, "Camera Calibration Toolbox for Matlab," http://www.vision.caltech.edu/bouguetj/calib_doc/.
Intel OpenCV Computer Vision Library (C++), http://www.intel.com/research/mrl/research/opencv/.
Giorgio Carpaneto, Paolo Toth, "Algorithm 548: Solution of the assignment problem [H]," ACM Transactions on Mathematical Software, 6(1): 104-111, 1980.
I. Hartley, A. Zisserman, "Multiple view geometry in computer vision," Cambridge University Press, Cambridge, UK 2000.
Longuet-Higgins, "A computer algorithm for reconstructing a scene from two projections" Nature, 293: 133-135, Sep. 1981.
T. Kailath, et al., "Linear Estimation," Prentice Hall, NJ, ISBN 0-13-022464-2, 854pp, 2000.
P. Saisan, "Modeling of Pedestrian Motion for recognition," IS&T/SPIE 17th annual symposium, San Jose, CA 2005.
A.R. Dick, et al., "Combining Single view recognition and multiple view stereo for architectural scenes," International Conference on Computer Vision (ICCV'01) vol. 1, Jul. 7-14, 2001, Vancouver, B.C., Canada.
G. Shakhanarovich, et al. "Integrated face and gait recognition from multiple views," In Proceedings of the IEEE Conference on Computer Vision and Pattern Recognition, Dec. 2001, Kauai, Hawaii.
Sujit Kuthirummal, et al., "Planar shape recognition across multiple views," In Proceedings of the Interationa Conference on Pattern Recognition (ICPR)—2002, Quebec, Canada . . . .
Sujit Kuthirummal, et al., "Multiview constraints for recognition of planar curves in fourier domain," Proceedings of the Indian Conference on Vision Graphics and Image Processing (ICVGIP)—2002.
A. Selinger and R.C. Nelson, "Appearance-based object recognition using multiple views," In Proceedings of the IEEE Conference on Computer Vision and Pattern Recognition—Dec. 2001, Kauai, Hawaii.
D.L. Swets, et al., "Genetics Algorithms for Object Recognition in a complex scene," Proc. of Intl. Conference on Image Processing, vol. 2, Oct., pp. 23-26, 1995.
V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.
Kennedy, J., et al., "Swarm intelligence," San Francisco: Morgan Kaufmann Publishers, 2001.
R.C. Eberhart, et al., "Particle swarm optimization: Developments, applications, and resources," Proceedings of IEEE Congress on Evolutionary Computation (CEC 2001), Korea, 2001.
R. Brits, et al., "A Niching Particle Swarm Optimizer," 2002.
F. Rojas, I. Rojas, R. M. Clemente, and C.G. Puntoner, "Nonlinear blind source separation using genetic algorithms," in Proceedings of International Conference on Independent Component Analysis, 2001.
D. Beasley, D. R. Bull, and R. R. Martin, "A Sequential Niching Technique for Multimodal Function Optimization," Evolutionary Computation, 1(2), p. 101-125, 1993.
R. Krishnapuram and J. M. Keller, "Quantative Analysis of Properties and Spatial Relations of Fuzzy Image Regions," Transactions on Fuzzy Systems, 1(2):98-110, 1993.
Y. Owechko, S. Medasani, and N. Srinivasa, "Classifier Swarms for Human Detection in infrared imagery," Proc. of the CVPR workshop on Object Tracking and Classification Beyond the Visible Spectrum (OTCBVS'04) 2004.
Y. Owechko, et al., "Vision-Based Fusion System for Smart Airbag Applications," Intelligent Vehicle Symposium, 2002. IEEE, Publication Date: Jun. 17-21, 2002, vol. 1, on pp. 245-250 vol. 1.
Y. Owechko and S. Medasani, "A Swarm-based Volition/Attention Framework for Object Recognition," IEEE Conference on Computer Vision and Pattern Recognition, San Diego, Proc. of CVPR-WAPCV 2005.
Y. Owechko and S. Medasani, "Cognitive Swarms for Rapid Detection of Objects and Associations in Visual Imagery," IEEE Swarm Intelligence Symposium, Pasadena, 2005.
P. Saisan, S. Medasani, and Y. Owechko "Multi-View Classifier Swarms for Pedestrian Detection and Tracking," IEEE Conference on Computer Vision and Pattern Recognition, San Diego, 2005.
N. Srinivasa, et al., "Fuzzy edge-symmetry features for enhanced intruder detection," 11th International Conference on Fuzzy Systems, FUZZIEEE 2003.
F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.
B. J. Scholl, "Objects and Attention: The State of the Art," Cognition 80: 1-46, 2001.
Y. Sun and R. Fisher, "Hierarchical Selectivity for Object-based Visual Attention," submitted to Artificial Intelligence, 2004.
Liao, Wenhul and Ji, Qiang 2006, "Efficient Active Fusion for Decision-making via VOI Approximation," in Proc. AAAI 2006, 1180-1185.
Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.
A. Huertas, and R. Nevatia, "Detecting Changes in Aerial Views of Man-Made Structures," IVC200.
R. Mendes, "The Fully Informed Particle Swarm: Simpler, Maybe Better," Special issue of IEEE Trans. on Evol. Computation on Particle Swarm Optimization, vol. 8, No. 3, Jun. 2004.

(56) References Cited

OTHER PUBLICATIONS

K.E. Parsopoulos, et al. "On the Computation of All Global Minimizers Through Particle Swarm Optimization," Special issue of IEEE Trans. on Evol. Computation on Particle Swarm Optimization, vol. 8, No. 3, Jun. 2004.

F. van der Bergh, et al., "A Cooperative Approach to Particle Swarm Optimization," Special issue of IEEE Trans. on Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. on Evol. Computation on Particle Swarm Optimization, vol. 8, No. 3, Jun. 2004.

C.A. Coello, "Handling Multiple Objectives With Particle Swarm Optimization," Special issue of IEEE Trans. on Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. on Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. on Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

B. Bhanu, et al., "Adaptive Image Segmentation Using a Genetic Algorithm," IEEE Transactions on Systems, Man, and Cybernetics, vol. 25, No. 12, Dec. 1995.

Office action from U.S. Appl. No. 10/918,336.

\* cited by examiner

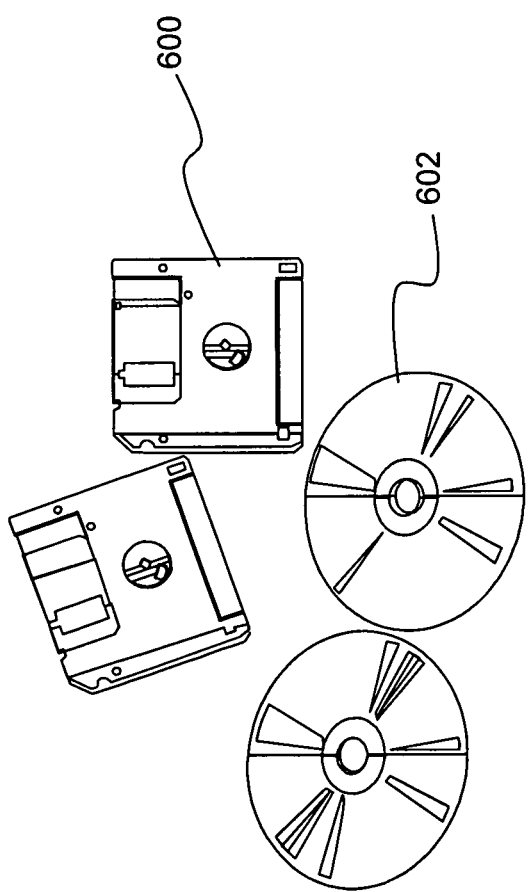

METHOD FOR PARTICLE SWARM OPTIMIZATION WITH RANDOM WALK

BACKGROUND OF THE INVENTION

(1) Field of Invention

The present invention relates to a method for particle swarm optimization and, more particularly, to a method for particle swarm optimization which utilizes a random walk process.

(2) Description of Related Art

The use of evolutionary heuristic optimization algorithms, such as genetic algorithms (GAs) and particle swarm optimization (PSO) algorithms, for a variety of applications is well known in the art. While these methods are effective, the present invention improves on what is currently known in the art by increasing the success rate of the PSO algorithm in addition to reducing the required computation.

PSO is a simple but powerful population-based algorithm that is effective for optimization of a wide range of functions as described by Eberhart and Shi (see Literature Reference No. 1). PSO models the exploration of a multi-dimensional solution space by a "swarm" of software agents, or particles, where the success of each agent has an influence on the dynamics of other members of the swarm. Each particle in a swarm of N particles resides in a multi-dimensional solution space. The positions of the particles represent candidate problem solutions. Additionally, each particle has a velocity vector that allows it to explore the space in search of an optimum of an objective function J.

FIG. 1 illustrates a prior art model of PSO depicting a multi-dimensional solution space 100 through which particles, for example particle $P_i$ 102, travel in search of an optimum of an objective function (see Literature Reference No. 1). As described above, the positions of the particles represent vectors of multi-node parameter values in the solution space 100. In addition, each of the particles, including $P_i$ 102, has a velocity vector 104 that allows it to explore the multi-dimensional solution space 100.

Although PSO is a relatively new area of research, literature exists which documents its efficiency and robustness as an optimization tool for high dimensional spaces (see Literature Reference Nos. 2 and 8). Both theoretical analysis and practical experience demonstrate that PSO converges on good solutions for a wide range of parameter values (see Literature Reference Nos. 3-7). The evolution of good solutions is stable in PSO because of the manner in which solutions are represented (i.e., small changes in the representation result in small changes in the solution). Furthermore, simulations have shown that the number of particles and iterations required are relatively low and scale slowly with the dimensionality of the solution space (see Literature Reference Nos. 9 and 10). However, the amount of computation required for PSO is still linearly proportional to the number of particles or the iterations required for a given problem. Therefore, reducing the number of particles or iterations required for a given problem can effectively reduce the computational cost of PSO. Thus, a continuing need exists for a method for PSO that efficiently reduces the number of iterations required to derive a solution.

SUMMARY OF THE INVENTION

The present invention relates to a system for particle swarm optimization utilizing a random walk process. The system comprises one or more processors that are configured to perform operations of operating a plurality of software agents as a cooperative swarm to locate an optimum of an objective function. Each agent is assigned an initial velocity vector to explore a multi-dimensional solution space, where each agent is configured to perform at least one iteration. The iteration is a search in the multi-dimensional solution space for the optimum of the objective function. Additionally, each agent keeps track of a first position vector representing a current best solution $y_i$ that the agent has identified and a second position vector used to store the current global best solution $y_g$ among all agents. In a first phase, the plurality of software agents randomly explores the multi-dimensional solution space to locate the optimum of the objective function. Furthermore, in a second phase, the velocity and position vectors for a particle i are updated probabilistically to locate the optimum of the objective function. Finally, the plurality of software agents converge at a position in the multi-dimensional solution space representing an optimum of the objective function, wherein the objective function is $J(\vec{y}_g)$.

In another aspect, the velocity and position vectors for a particle i are updated according to the following:

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_i(t)]$$

$$\vec{x}_i(t+1) = \vec{x}_i(t) + \chi \vec{v}_i(t+1),$$

wherein for $t \geq 1$, $y_i$ and $y_g$ are computed according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

$$\vec{y}_g(t+1) = \operatorname*{argmax}_{\vec{y}_i} J(\vec{y}_i(t+1))$$

where $\vec{x}_i(t)$ is a position vector and $\vec{v}_i(t)$ is a velocity vector at an iteration t of an i-th agent, $c_1$ and $c_2$ are each parameters that weight an influence of the current best solution $y_i$ and the current global best solution $y_g$, w is a momentum constant that prevents premature convergence of the agents, x is a constriction factor which influences the convergence of the agents, and $q_1$ and $q_2$ are each random variables that allow the agents to better explore the multi-dimensional solution space, which have the same dimensions as $\vec{v}_i$ or $\vec{x}_i$ and have uniformly distributed random components in the range of $[-1.0, 1.0]$ drawn on each iteration.

In another aspect, in the first phase, each agent undergoes a Brownian motion style random walk process.

In yet another aspect, in the first phase, each agent is driven by a random force according to the following:

$$\vec{v}_i(t+1) = w\vec{v}_i(t) + c_0 q_0(t)$$

$$\vec{x}_i(t+1) = \vec{x}_i(t) + \chi \vec{v}_i(t+1),$$

wherein for $t \geq 1$, $y_i$ and $y_g$ are computed according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

-continued $$\vec{y}_g(t+1) = \underset{\overline{y_i}}{\mathrm{argmax}} J(\vec{y}_i(t+1))$$

where $\vec{x}_i(t)$ is a position vector and $\vec{v}_i(t)$ is a velocity vector at an iteration t of an i-th agent, w is a momentum constant that prevents premature convergence of the agents, x is a constriction factor which influences the convergence of the agents, $c_0$ is a constant, $q_0(t)$ is a vector with the same dimension as $\vec{v}_i$ or $\vec{x}_i$ with a set of uniformly distributed random components in [−1.0, 1.0] drawn on each iteration, wherein the current best $y_i$ and the global best $y_g$ computed in the first phase are used as an initial current best $y_i$ and global best $y_g$ in the second phase.

In another aspect, the first phase continues for a first n iterations, where n is a small integer, and wherein following the first n iterations, the second phase is initiated.

In another aspect, the first phase and the second phase are repeated for multiple cycles as needed in order to prevent premature convergence on a non-optimum solution.

In another aspect, during an image registration process, the position vectors of the plurality of software agents represent a set of candidate transformation parameters in the multi-dimensional solution space, wherein the multi-dimensional solution space is a transformation space, and wherein convergence of the plurality of software agents at the optimum of the represents an alignment of a set of images.

In yet another aspect, during an object recognition process, the plurality of software agents is used to find a location in an image which maximizes the objective function, wherein the optimum of the objective function is a confidence level of an object classifier.

In another aspect, during an antenna beamforming process, the optimum of the objective function is a signal to noise ratio for a received signal, wherein a set of solution parameters represent a set of weighting coefficients for elements of an antenna array.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is an illustration of a computer program product according to the present invention.

DETAILED DESCRIPTION

Figure 1:
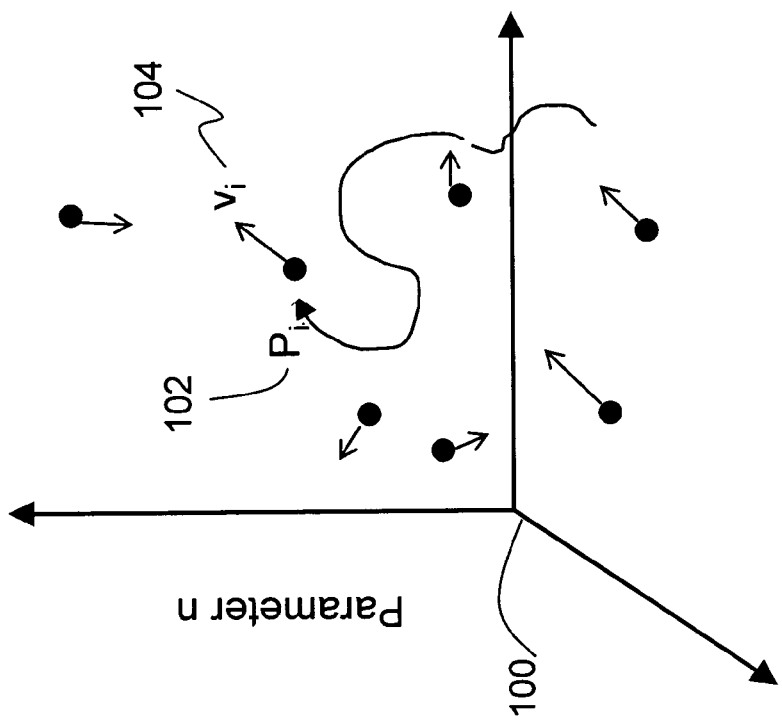
FIG. 1 illustrates a graphical model of particle swarm optimization (PSO) according to prior art.

The present invention relates to a method for particle swarm optimization and, more particularly, to a method for particle swarm optimization which utilizes a random walk process. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. R. C. Eberhart and Y. Shi, "Particle Swarm Optimization: Developments, Applications, and Resources," Proceeding of IEEE Congress on Evolutionary Computation, Korea, 2001.
2. Special Issue of IEEE Trans. On Evol. Computation on Particle Swarm Optimization, Vol. 8, No. 3, June, 2004.

3. S. Medasani and Y. Owechko, "Possibilistic Particle Swarms for Optimization," Proceedings 5673 of SPIE/IST Symposium on Electronic Imaging, San Jose, 2005.
4. Y. Owechko, S. Medasani, and N. Srinivasa, "Classifier Swarms for Human Detection in Infrared Imagery," IEEE Conference on Computer Vision and Pattern Recognition, Washington, D.C., 2004.
5. Y. Owechko and S. Medasani, "A Swarm-Based Volition/Attention Framework for Object Recognition," IEEE Conference on Computer Vision and Pattern Recognition, San Diego, 2005.
6. Y. Owechko and S. Medasani, "Cognitive Swarms for Rapid Detection of Objects and Associations in Visual Imagery," IEEE Swarm Intelligence Symposium, Pasadena, 2005.
7. P. Saisan, S. Medasani, and Y. Owechko, "Multi-View Classifier Swarms for Pedestrian Detection and Tracking," IEEE Conference on Computer Vision and Pattern Recognition, San Diego, 2005.
8. R. Hassan, B. Cohanim, and O. de Weck, "A Comparison of Particle Swarm Optimization and the Genetic Algorithm," American Institute of Aeronautics and Astronautics Conference, 2005.
9. J. F. Schutte, J. A. Reinbolt, B. J. Fregly, R. T. Haftka, and A. D. George, "Parallel Global Optimization with the Particle Swarm Algorithm," Int. J. Numerical Methods in Engineering, 61:2296-2315, 2004.
10. J. Kennedy and W. M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

(2) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used. The definitions for Brownian motion and random walk were provided by "Wikipedia, The Free Encyclopedia." Wikipedia can be found at www.wikipedia.org.

Brownian Motion—The term "Brownian motion" as used with respect to the present invention refers to a mathematical model used to describe random movement of particles, often called a particle theory.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

Particle—The term "particle" is also to be used interchangeably with the term "software agent". Particle is the term used to represent a solution to an optimization problem. In the case of image registration, the goal is to identify the two dimensional translation and the single rotation that maximizes the correlation between two images. Each particle is a three element vector of two translations and a rotation to apply to an image and then check the registration between the translated/rotated image and the reference image.

Random Walk—The term "random walk" as used with respect to the present invention refers to a mathematical formalization of a trajectory that consists of taking successive random steps.

(3) Principal Aspects

The present invention has three "principal" aspects. The first is a system which improves the initialization of the PSO with a random walk process. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for PSO initialization utilizing a random walk process, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

(4) Specific Details

The present invention describes particle swarm optimization with random walk (PSORW), which is a modification of PSO. As described above, PSO models the exploration of a multi-dimensional solution space by a "swarm" of software agents, or particles, where the success of each agent has an influence on the dynamics of other members of the swarm. Each particle in the swarm resides in a multi-dimensional solution space, and the positions of the particles represent candidate problem solutions. Each particle i keeps track of a position vector $\vec{y}_i$ that represents the current best solution the particle has found. Another position vector $\vec{y}_g$ is used to store the current global best solution found by all of the particles. The velocity and position vectors for particle i are then changed probabilistically according to the following set of dynamic update equations:

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_i(t)] \quad (1)$$

$$\vec{x}_i(t+1) = \vec{x}_i(t) + \chi \vec{v}_i(t+1),$$

$\vec{x}_i(0)$ is a random vector over the solution space,
$\vec{v}(0)$ is typically 0,
t is the iteration number, and
i=1 ... N, where N is the number of particles,
with the update rules for t≥1 for each particle's current best $y_i$ and the global best $y_g$ of all particles written as:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases} \quad (1a)$$

-continued $$\vec{y}_g(t+1) = \underset{\vec{y_i}}{\mathrm{argmax}}\, J(\vec{y}_i(t+1))$$

where $\vec{x}_i(t)$ and $\vec{v}_i(t)$ are the position and velocity vectors at iteration t of the i-th particle and $c_1$ and $c_2$ are parameters that weight the influence of the "individual best" and "swarm best" terms. Typical values for $c_1$ and $c_2$ are 1.4 and 1.4. w is a momentum constant that prevents premature convergence, and x is a constriction factor which also influences the convergence of PSO. In experimental tests, w was set to 1.4 and x to 0.2. $q_1$ and $q_2$ are random variables that allow the particles to better explore the solution space, which have the same dimensions as $\vec{v}_i$ or $\vec{x}_i$ and have uniformly distributed random components in the range of $[-1.0, 1.0]$ drawn on each iteration. $\vec{x}_i(0)$ can be uniformly distributed or be distributed based on some prior knowledge about the problem domain, if any. For each iteration, exactly one objective function evaluation is carried out by each particle.

The described dynamics cause the swarm to concentrate on promising regions of solution space very quickly with very sparse sampling of the solution space. The iteration expressed in equations (1) and (1a) above continues until a $\vec{y}_g$ is found that satisfies some preset condition for $J(\vec{y}_g)$, which indicates a success, or t exceeds a predefined maximum number of iterations, which means the search did not converge, or the optimization has failed. In the examples described herein, it is assumed that the objective function J is to be maximized. However, as would be obvious to one of ordinary skill in the art, the case of J to be minimized can be formulated similarly.

As will be described in detail below, PSORW allows swarm particles to explore locally in a Brownian motion style random walk process to discover the local objective function properties before engaging in the normal PSO process. In a first phase, the PSO swarm moves freely and randomly, exploring the solution space without any guidance. The first phase is followed by a second phase, which requires the swarm population to follow the standard update rule specified by the PSO update equation as described above. A swarm particle without attraction force from either "individual best" or "swarm best" undergoes Brownian motion style random walk driven by a random force according to the following PSORW update equations:

$$\vec{v}_i(t+1) = w\vec{v}_i(t) + c_0 q_0(t) \qquad (2)$$
$$\vec{x}_i(t+1) = \vec{x}_i(t) + \chi \vec{v}_i(t+1),$$

wherein for $t \geq 1$, $y_i$ and $y_g$ are computed according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

$$\vec{y}_g(t+1) = \underset{\vec{y_i}}{\mathrm{argmax}}\, J(\vec{y}_i(t+1))$$

where $\vec{x}_i(t)$ is a position vector and $\vec{v}_i(t)$ is a velocity vector at an iteration t of an i-th agent, w is a momentum constant that prevents premature convergence of the agents, x is a constriction factor which influences the convergence of the agents. Both w and x take the same values as described above in Equation (1). $c_0 q_0(t)$ is a vector with the same dimension as $\vec{v}_i$ or $\vec{x}_i$ with a set of uniformly distributed random components in $[-1.0, 1.0]$ drawn on each iteration. $c_0$ is a constant chosen depending on the problem at hand.

The PSORW equations are used as the update rule only for the first n iterations (i.e., t=1, . . . ,n), where n is typically a small integer. Following the first n iterations, there is a switch back to the PSO update rule (equation 1) described previously (i.e., for t>n). During the random walk process, the particles still update the "individual best" ($y_i$) and the "swarm best" ($y_g$) values encountered so for as in standard PSO, although these values do not affect how the particles move during the random walk phase. However, the $\vec{y}_g$ and $\vec{y}_i$ values computed for $J(\vec{y}_g)$ during the random walk phase are used as the initial values in the standard PSO dynamic update equations (equation 1).

The primary benefit of PSORW is the ability to increase the chance that a PSO-based optimization process finds the global best solution, especially for high dimensional solution spaces. By allowing the particles to undergo a random walk phase, the particles have an increased opportunity to explore their neighborhood, land in the neighborhood of a true optimum, and avoid prematurely converging on a sub-optimum. This approach allows achievement of the same success rate with fewer particles than conventional PSO, thereby reducing the overall computation cost. In order to achieve this goal, the constant $c_0$ was chosen to be approximately equal to the width of the objective function J around its peak. The idea is that a particle's movement in one step during the random walk should not take the particle out of the convergence region. Therefore, $c_0$ is selected accordingly to limit the particles' movement. The width of the peak of an objective function can be measured experimentally by sampling the objective function for a specific application.

Considering all of the above, the complete PSORW update equations can be written as follows:

For t=1, . . . ,n, $$\vec{v}_i(t+1) = w\vec{v}_i(t) + c_0 \vec{q}_0(t) \qquad (3)$$
$$\vec{x}_i(t+1) = \vec{x}_i(t) + \chi \vec{v}_i(t+1),$$

$\vec{x}_i(0)$ is a random vector over the solution space,
$\vec{v}(0)$ is typically 0,
t is the iteration number, and
i=1 . . . N, where N is the number of particles.

For $t > n$, (4)

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_i(t)]$$
$$\vec{x}_i(t+1) = \vec{x}_i(t) + \chi \vec{v}_i(t+1),$$

with the update rules for $t \geq 1$ for each particle best and the global best of all particles written as:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases} \qquad (5)$$

-continued $$\vec{y}_g(t+1) = \underset{\vec{y}_i}{\operatorname{argmax}} J(\vec{y}_i(t+1)).$$

The iteration expressed in equations (3), (4), and (5) continues until a $\vec{y}_g$ is found that satisfies some preset condition for $J(\vec{y}_g)$, which indicates a success, or t exceeds a predefined maximum number of iterations, which means the search did not converge, or the optimization has failed. $\vec{x}_i$ can be uniform or be based on some prior knowledge, if any. For each iteration, exactly one objective function evaluation is carried out by each particle. The particle best ($y_i$) and the global best for all particles ($y_g$) are computed in parallel for both phases; however, the values from the random walk phase are not used until the PSO phase is initiated (i.e., when t>n).

Applications of PSORW include, but are not limited to, computer vision, mobile ad hoc wireless networks, sensor networks, smart antennas, smart materials, resource allocation, factory scheduling, and fast search. PSORW is most useful for situations where the objective function has many local optima, where the swarm of particles can become "stuck" if it is not periodically "reset" using a random walk process.

A non-limiting example of an application for PSORW is image registration. Image registration is the process of transforming different sets of data into one coordinate system, which allows the comparison or integration of data obtained from different measurements. For instance, image registration may involve aligning two images of the same scene or set of objects, where the images are from different cameras or different viewpoints. During image registration, two images of the same scene are aligned using a geometric transformation. Using the present invention, the parameters of the transformation can be found by PSORW, where the positions of the particles represent the candidate solutions in the transformation space. Furthermore, the vector of parameter values is simply the translation and rotation of the transformation. In this case, the convergence of the particles at an objective function optima represents alignment of two images within a given threshold.

Another application for PSORW is object recognition, wherein the swarm of particles is used to find a location in an image which maximizes an objective function. In this case, the objective function is a confidence level of an object classifier. Furthermore, the swarm can also search other solution dimensions simultaneously, such as the size and rotation angle of the object. Additionally, PSORW can be used for antenna beamforming, where the objective function to be optimized is the signal to noise ratio for a received signal. In this case, the solution parameters are a set of weighting coefficients for the elements of an antenna array.

Figure 2:
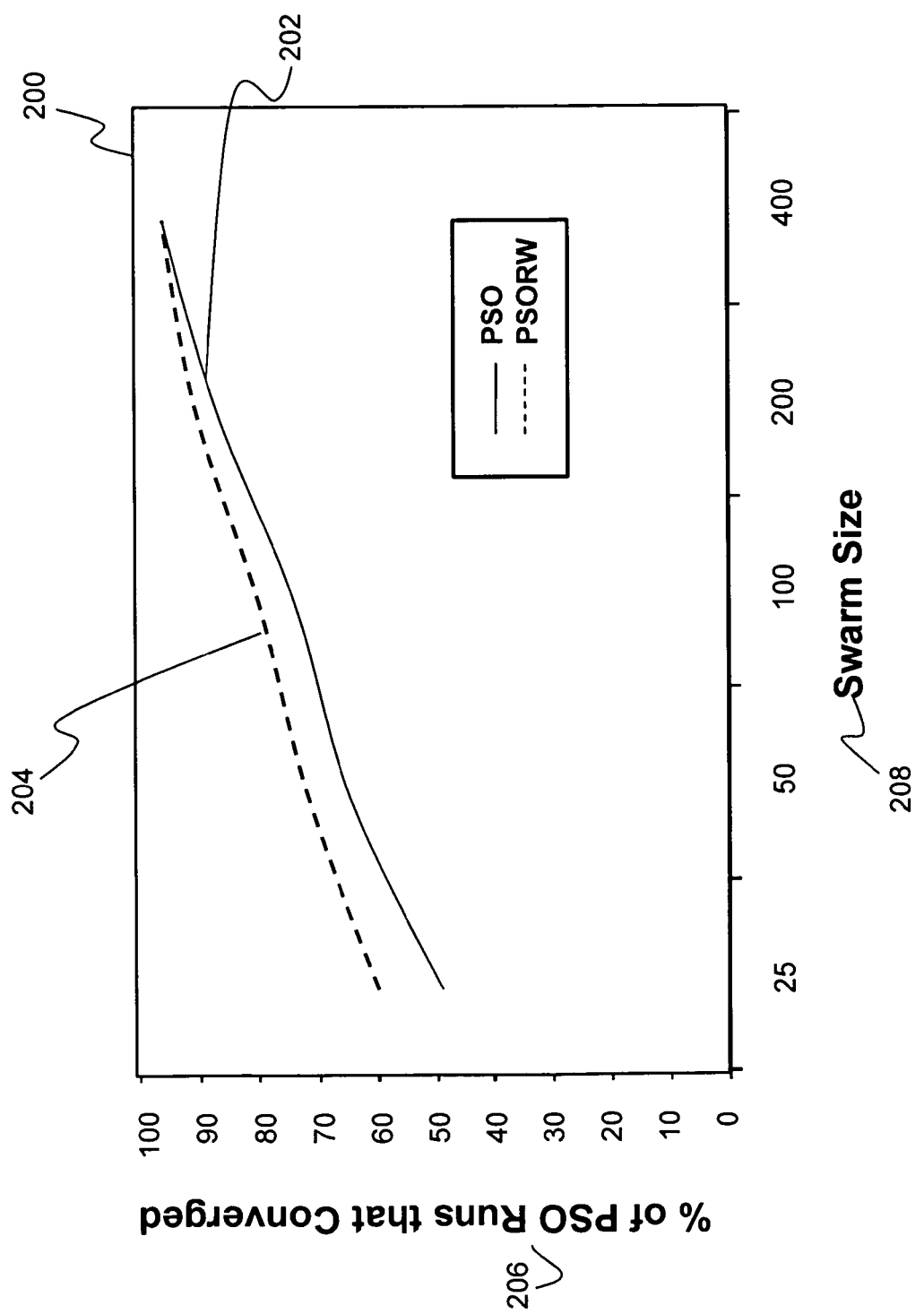
FIG. 2 is an illustration of a plot depicting a convergence rate comparison between PSO and particle swarm optimization with random walk (PSORW) according to the present invention.

As illustrated in FIG. 2, PSORW was tested using an image registration example in which two images of the same scene are aligned using a geometric transformation with parameters found by PSO. As a non-limiting example, the image transformation is assumed to contain three transformation parameters, which include two translations and one rotation. Standard PSO and PSORW with three iterations (n=3) in the first phase were tested. FIG. 2 is a plot 200 illustrating a comparison of convergence rates between PSO 202 and PSORW 204. As shown in FIG. 2, the plot 200 depicts the convergence rate 206 of one hundred runs at random initial starting positions for an image registration task using various swarm sizes 208 with PSO 202 and PSORW 204. The PSO 202 runs are capped at a maximum number of iterations beyond which the run is considered not converging if the correct registration parameters have not been found (i.e., registration error is still greater than a set threshold).

With PSORW 204, the convergence rate 206 (i.e., the rate of success in finding the correct registration) increases appreciably when compared with PSO 202, especially at small swarm sizes 208. As illustrated in FIG. 2, the advantage diminishes as the swarm size 208 increases. Intuitively, as the swarm size increases, the chance that an optimum location will be missed is lower than if the swarm size is small. Therefore, the benefit of PSORW is more apparent when the swarm size is small.

Figure 3:
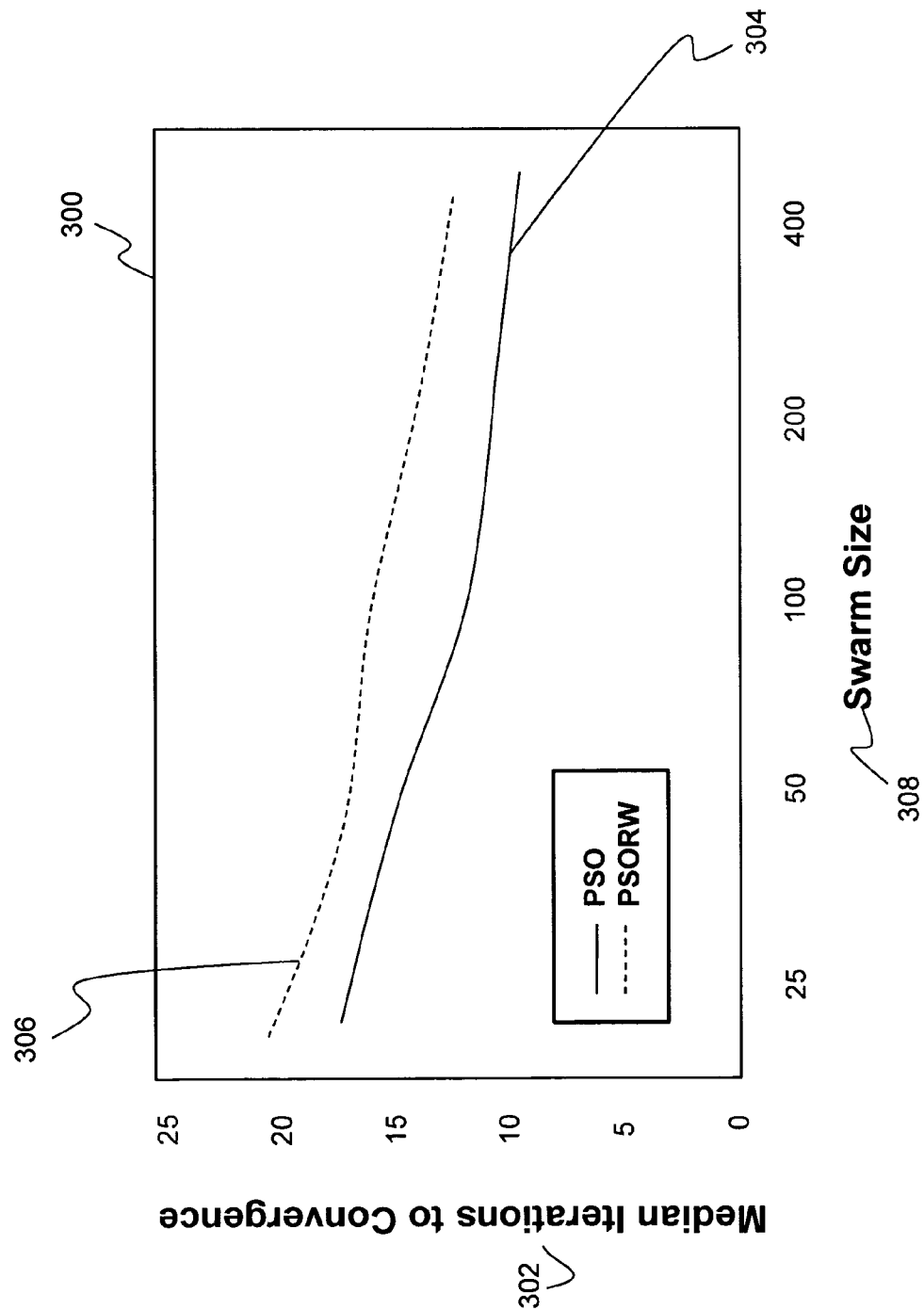
FIG. 3 is an illustration of a plot depicting median iterations to convergence for PSO and PSORW according to the present invention.

Additionally, the advantage of PSORW can be quantified by the computations required compared with PSO. FIG. 3 is a plot 300 depicting the median iterations to convergence 302 for PSO 304 and PSORW 306 for one hundred runs for various swarm sizes 308. It is clear from the plot 300 that the median iterations to convergence 302 for PSORW 306 is approximately three more than PSO 304, which is precisely the number of iterations (t) spent on the initial random walk. Thus, when the same number of particles is used by PSO and PSORW, PSORW does not find the solution any faster.

However, since PSORW allows smaller swarm sizes to achieve the same level of performance in terms of convergence rate, the swarm size can be reduced to reduce the computation cost without sacrificing performance. For instance, as shown in FIG. 2, PSO 206 with a swarm size 204 of one hundred achieved a 72% convergence rate 202, while PSORW 208 achieved a comparable convergence rate of 69% with a swarm size 204 of only fifty.

As illustrated in FIG. 3, the median number of iterations 302 for PSO 304 with a swarm size 308 of one hundred is twelve, while the median number of iterations 302 for PSORW 306 with a swarm size 308 of fifty is seventeen. For each iteration, exactly one objective function evaluation is carried out by each particle. Thus, the number of times the objective function is evaluated by the two approaches can be calculated by computing the product of the swarm size and the number of iterations. Referring to the example above, for PSO, the number of times the objective function is evaluated is one hundred multiplied by twelve, resulting in twelve hundred; the number of times the objective function is evaluated for PSORW is fifty multiplied by seventeen, resulting in eight hundred fifty. Hence, there is a 30% reduction in computation for PSORW compared with PSO.

Figure 4:
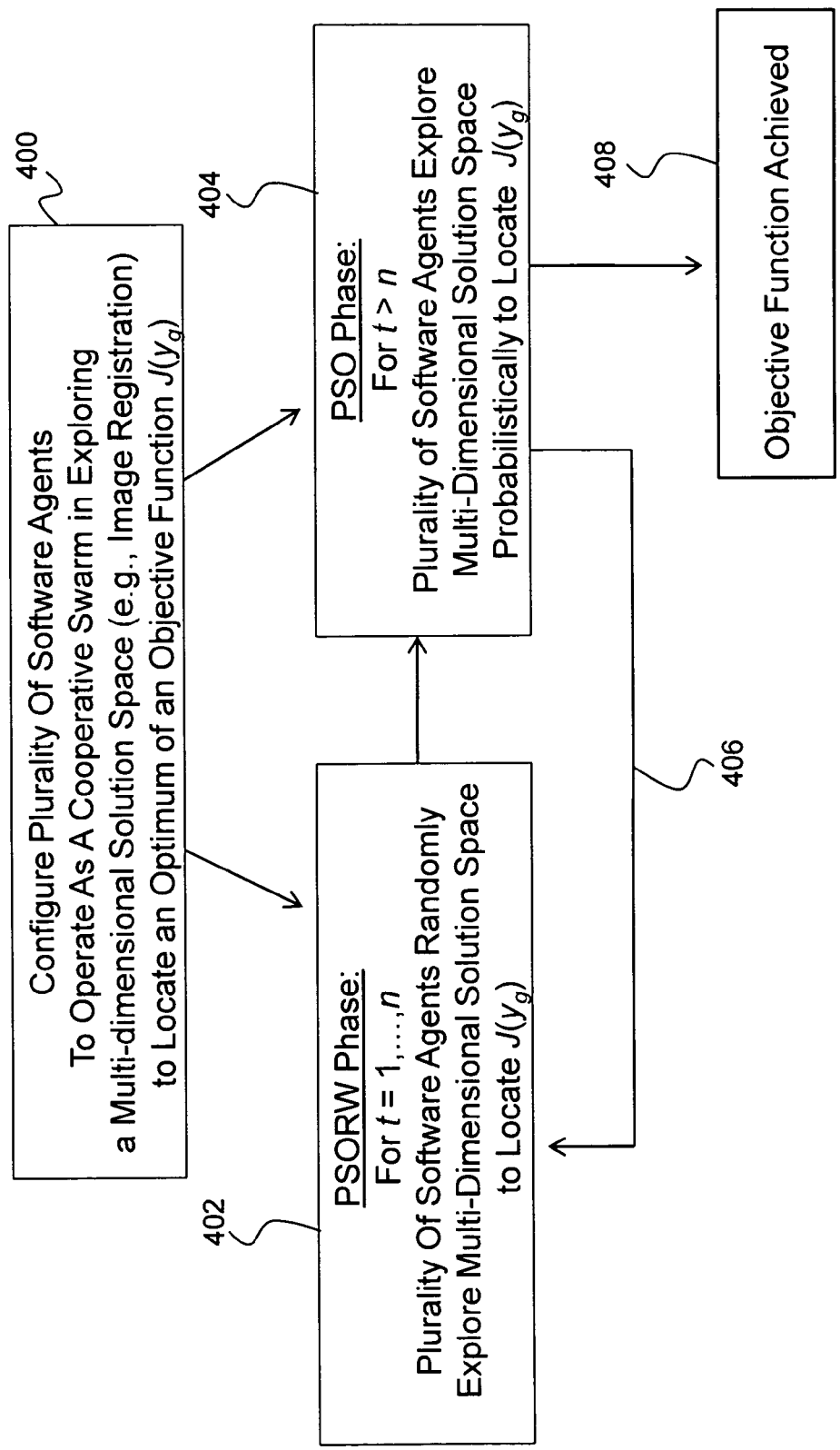
FIG. 4 is a flow diagram illustrating a method for PSO utilizing a random walk process according to the present invention.

FIG. 4 illustrates a flow chart depicting a method for particle swarm optimization utilizing random walk. As described in detail above, a plurality of software agents are configured to operate as a cooperative swarm to locate an optimum of an objective function 400. In a first PSORW phase 402, the plurality of software agents randomly explores the multi-dimensional solution space according to the PSORW process described above. In a second PSO phase 404, velocity and position vectors for each particle are updated probabilistically according to a set of PSO update equations as described above. As shown, the PSORW phase 402 and the PSO phase 404 are two branches of a process flow. The particle best ($y_i$) and the global best for all particles ($y_g$) are computed in parallel for both phases 402 and 404; however, the values from the PSORW phase 402 are not used until the PSO phase 404 is initiated (i.e., when t>n).

As illustrated with the feedback loop 406 shown in FIG. 4, these two phases can be repeated multiple times to prevent premature convergence on a non-optimum solution. For example, if after a certain number of iterations in the PSO phase 404, it is determined that the objective function (e.g., a global optimum based on prior knowledge) has not been achieved, the process may be repeated (i.e., PSORW phase 402 processing followed by PSO phase 404). When repeating the PSORW phase 402, the initial positions of the particles must be redistributed to overcome the local optimum reached previously. Alternatively, if the objective function has been achieved 408 (e.g., an image registration error is less than a set threshold), the particles converge at a location representing an optimal solution (e.g., a set of parameters for image registration).

Figure 5:
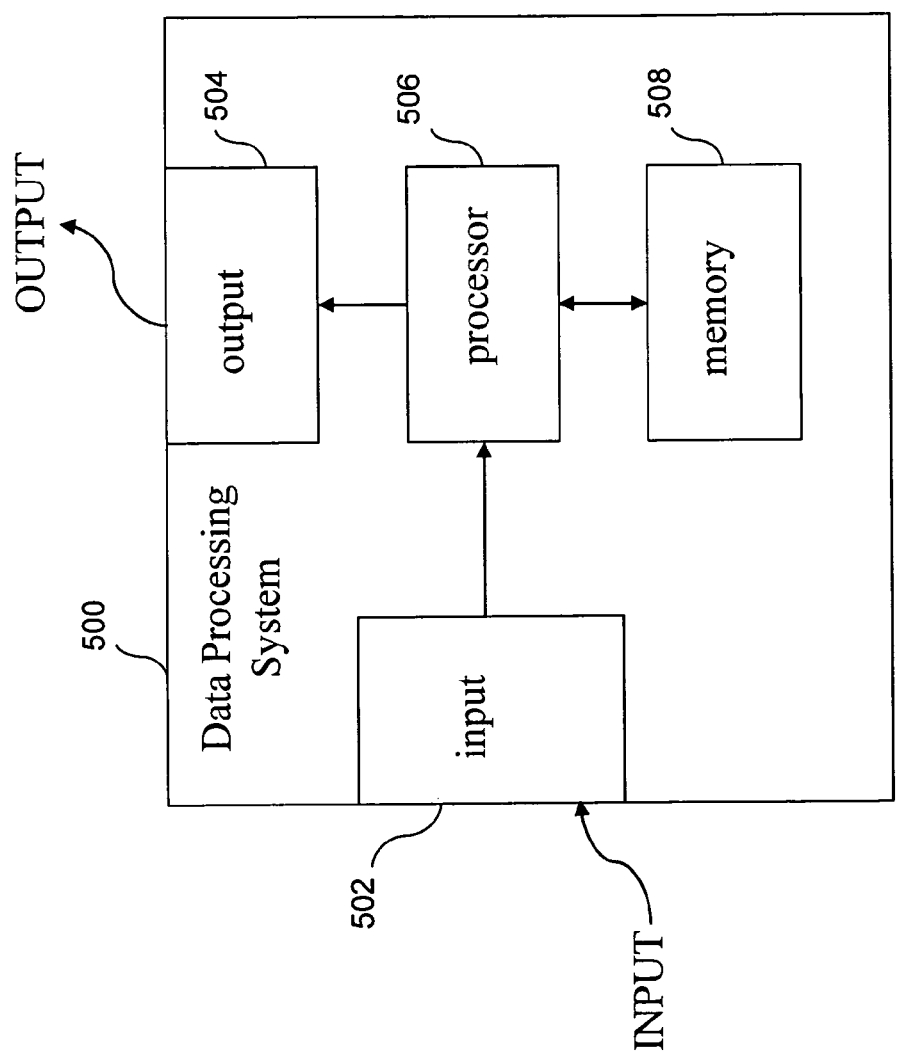
FIG. 5 is an illustration of a data processing system according to the present invention.

FIG. 5 illustrates a block diagram depicting components of a data processing system 500 (e.g., computer) incorporating the operations of the method described above. The method utilizes a data processing system 500 for storing computer executable instruction means for causing a processor (or processors) to carry out the operations of the above described method. The data processing system 500 comprises an input 502 for receiving information from a user. Information received may include input from devices such as cameras, scanners, keypads, keyboards, microphone, other peripherals such as storage devices, other programs, etc. The input 502 may include multiple "ports." An output 504 is connected with a processor 506 for providing information for transmission to other data processing systems, to storage devices, to display devices such as monitors, to generating information necessary for delivery, and to other mechanisms for presentation in user-usable forms. The input 502 and the output 504 are both coupled with the processor 506 (or processors), which may be a general-purpose computer processor or a specialized processor designed specifically for use with the present invention. The processor 506 is coupled with a memory 508 to permit storage of data and software to be manipulated by commands to the processor 506.

An illustrative diagram of a computer program product embodying the present invention is depicted in FIG. 6. As a non-limiting example, the computer program product is depicted as either a floppy disk 600 or an optical disk 602. However, as mentioned previously, the computer program product generally represents computer readable code stored on any compatible computer readable medium.

What is claimed is:

1. A system implementing particle swami optimization, the system comprising one or more processors that are configured to perform operations of:
operating a plurality of software agents as a cooperative swarm to locate an optimum of an objective function, wherein each agent is assigned an initial velocity vector to explore a multi-dimensional solution space, where each agent is configured to perform at least one iteration, the iteration being a search in the multi-dimensional solution space for the optimum of the objective function, where each agent keeps track of a first position vector representing a current best solution $y_i$ that the agent has identified, and a second position vector used to store the current global best solution $y_g$ among all agents;
wherein in a first phase, the plurality of software agents randomly explore the multi-dimensional solution space utilizing a random walk process to locate, the optimum of the objective function;
wherein in a second phase that follows the first phase, the velocity and position vectors for a particle i are updated probabilistically to locate the optimum of the objective function;
wherein in the first phase, each agent is driven by a random force according to the following:

$$\vec{v}_i(t+1) = w\vec{v}_i(t) + c_0\vec{q}_0(t)$$

$$\vec{x}_i(t+1) = \vec{x}_i(t) + \chi\vec{v}_i(t+1),$$

wherein for t≥1, $y_i$ and $y_g$ and are computed according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

$$\vec{y}_g(t+1) = \underset{\vec{y}_i}{\text{argmax}} J(\vec{y}_i(t+1)),$$

where $\vec{x}_i(t)$ is a position vector and $\vec{v}_i(t)$ is a velocity vector at an iteration t of an i-th agent, w is a momentum constant that prevents premature convergence of the agents, x is a constriction factor which influences the convergence of the agents, $c_0$ is a constant, $q_0(t)$ is a vector with the same dimension as $\vec{v}_i$ or $\vec{x}_i$ with a set of uniformly distributed random components in [−1.0, 1.0] drawn on each iteration, wherein the current best $y_i$ and the global best $y_g$ computed in the first phase are used as an initial current best $y_i$ and global best $y_g$ in the second phase;
wherein the first phase runs for a predetermined number of iterations prior to initiation of the second phase; and
wherein the plurality of software agents converge at a position in the multi-dimensional solution space representing an optimum of the objective function, wherein the objective function is $J(\vec{y}_g)$.

2. The system implementing panicle swarm optimization as set forth in claim 1, wherein the velocity and position vectors for a particle i are updated according to the following in the second phase:

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_i(t)]$$

$$\vec{x}_i(t+1) = \vec{x}_i(t) + \chi\vec{v}_i(t+1),$$

wherein for t≥1, $y_i$ and $y_g$ are computed according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

$$\vec{y}_g(t+1) = \underset{\vec{y}_i}{\text{argmax}} J(\vec{y}_i(t+1)),$$

where $\vec{x}_i(t)$ is a position vector and $\vec{v}_i(t)$ is a velocity vector at an iteration t of an i-th agent, $c_1$ and $c_2$ are each parameters that weight an influence of the current best solution $y_i$ and the current global best solution $y_g$, w is a momentum constant that prevents premature convergence of the agents, x is a constriction factor which influences the convergence of the agents, and $q_1$ and $c_2$ are each random variables that allow the agents to better explore the multi-dimensional solution space, which have the same dimensions as $\vec{v}_i$ or $\vec{x}_i$ and have uniformly distributed random components in the range of [−1.0, 1.0] drawn on each iteration.

3. The system implementing particle swarm optimization as set forth in claim 2, wherein in the first phase, each agent undergoes a Brownian motion style random walk process.

4. The system implementing particle swarm optimization as set forth in claim 3, wherein the first phase and the second phase can be repeated for multiple cycles as needed in order to prevent premature convergence on a non-optimum solution.

5. The system implementing particle swarm optimization as set forth in claim 4, wherein the system is configured to perform an image registration such that during an image registration process, the position NV COTS of the plurality of software agents represent a set of candidate transformation parameters in the multi-dimensional solution space, wherein the multi-dimensional solution space is a transformation space, and wherein convergence of the plurality of software agents at the optimum of the objective fraction represents an alignment of a set of images.

6. The system implementing particle swarm optimization as set forth in claim 4, during an object recognition process, the plurality of software agents is used to find a location in an image which maximizes the objective function, wherein the optimum of the objective function is a confidence level of an object classifier.

7. The system implementing particle swarm optimization as set forth in claim 4, wherein during an antenna beamforming process, the optimum of the objective function is a signal to noise ratio for a received signal, and wherein a set of solution parameters represent a set of weighting coefficients for elements of an antenna array.

8. A computer-implemented method for particle swarm optimization, the method comprising an act of causing a processor to perform operations of:
operating a plurality of software agents as a cooperative swarm to locate an optimum of an objective function, wherein each agent is assigned an initial velocity vector to explore a multi-dimensional solution space, where each agent is configured to perform at least one iteration, the iteration being a search in the multi-dimensional solution space for the optimum of the objective function, where each agent keeps track of a first position vector representing a current best solution $y_i$ that the agent has identified, and a second position vector used to store the current global best solution $y_g$ among all agents;
wherein in a first phase, the plurality of software agents randomly explore the multi-dimensional solution space utilizing a random walk process to locate the optimum of the objective function;
wherein in a second phase that follows the first phase, the velocity and position vectors for a particle i are updated probabilistically to locate the optimum of the objective function;
wherein in the first phase, each agent is driven by a random force according to the following:

$$\vec{v}_i(t+1) = w\vec{v}_i(t) + c_0\vec{q}_0(t)$$
$$\vec{x}_i(t+1) = \vec{x}_i(t) + \chi\vec{v}_i(t+1),$$

wherein for $t \geq 1$, $y_i$ and $y_g$ are computed according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

$$\vec{y}_g(t+1) = \underset{\vec{y}_i}{\operatorname{argmax}} J(\vec{y}_i(t+1)),$$

where $\vec{x}_i(t)$ is a position vector and $\vec{v}_i(t)$ is a velocity vector at an iteration t of an i-th agent, w is a momentum constant that prevents premature convergence of the agents, x is a constriction factor which influences the convergence of the agents, $c_0$ is a constant, $q_0(t)$ is a vector with the same dimension as $\vec{v}_i$ or $\vec{x}_i$ with a set of uniformly distributed random components in $[-1.0, 1.0]$ drawn on each iteration, wherein the current best $y_i$ and the global best $y_g$ computed in the first phase are used as an initial current best $y_i$ and global best $y_g$ in the second phase;
wherein the first phase runs for a predetermined number of iterations prior to initiation of the second phase; and
wherein the plurality of software agents converge at a position in the multi-dimensional solution space representing an optimum of the objective function, wherein the objective function is $J(\vec{y}_g)$.

9. The method for particle swarm optimization as set forth in claim 8, wherein the velocity and position vectors for a particle i are updated according to the following:

$$\vec{v}_i(t+1) = w\vec{v}_i(t) + c_1 q_1[\vec{y}_i(t) - \vec{x}_i(t)] + c_2 q_2[\vec{y}_g(t) - \vec{x}_i(t)]$$
$$\vec{x}_i(t+1) = \vec{x}_i(t) + \chi\vec{v}_i(t+1),$$

wherein for $t \geq 1$, $y_i$ and $y_g$ are computer according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

$$\vec{y}_g(t+1) = \underset{\vec{y}_i}{\operatorname{argmax}} J(\vec{y}_i(t+1)),$$

where $\vec{x}_i(t)$ is a position vector and $\vec{v}_i(t)$ is a velocity vector at an iteration i of an i-th agent, $c_1$ and $c_2$ are each parameters that weight an influence of the current best solution $y_i$ and the current global best solution $y_g$, w is a momentum constant that prevents premature convergence of the agents, x is a constriction factor which influences the convergence of the agents, and $q_1$ and $q_2$ are each random variables that allow the agents to better explore the multi-dimensional solution space, which have the same dimensions as $\vec{v}_i$ or $\vec{x}_i$ and have uniformly distributed random components in the range of $[-1.0, 1.0]$ drawn on each iteration.

10. The method for particle swarm optimization as set forth in claim 9, wherein in the first phase, each agent undergoes a Brownian motion style random walk process.

11. The method for particle swarm optimization as set forth in claim 10, wherein the first phase and the second phase can be repeated for multiple cycles as needed in order to prevent premature convergence on a non-optimum solution.

12. The method for particle swarm optimization as set forth in claim 11, further comprising an act of performing an image registration such that during an image registration process, the position vectors of the plurality of software agents represent a set of candidate transformation parameters in the multi-dimensional solution space, wherein the multi-dimensional solution space is a transformation space, and wherein convergence of the plurality of software agents at the optimum of the objective function represents an alignment of a set of images.

13. The method for particle swarm optimization as set forth in claim 11, wherein during an object recognition process, the plurality of software agents is used to find a location in an image which maximizes the objective function, wherein the optimum of the objective function is a confidence level of an object classifier.

14. The method for particle swarm optimization as set forth in claim 11, wherein during an antenna beamforming process, the optimum of the objective function is a signal to noise ratio for a received signal, and wherein a set of solution parameters represent a set of weighting coefficients for elements of an antenna array.

15. A computer program product for particle swarm optimization, the computer program product comprising computer-readable instruction means stored on a non-transitory computer-readable medium that are executable by a computer having a processor for causing the processor to perform operations of:

operating a plurality of software agents as a cooperative swarm to locate an optimum of an objective function, wherein each agent is assigned an initial velocity vector to explore a multi-dimensional solution space, where each agent is configured to perform at least one iteration, the iteration being a search in the multi-dimensional solution space for the optimum of the objective function, where each agent keeps track of a first position vector representing a current best solution $y_i$ that the agent has identified, and a second position vector used to store the current global best solution $y_g$ among all agents;

wherein in a first phase, the plurality of software agents randomly explore the multi-dimensional solution space utilizing a random walk process to locate the optimum of the objective function;

wherein in a second phase that follows the first phase, the velocity and position vectors for a particle i are updated probabilistically to locate the optimum of the objective function;

wherein in the first phase, each agent is driven by a random force according to the following:

$$\vec{v}_i(t+1) = w\vec{v}_i(t) + c_0\vec{q}_0(t)$$
$$\vec{x}_i(t+1) = \vec{x}_i(t) + \chi\vec{v}_i(t+1),$$

wherein for $t \geq 1$, $y_i$ and $y_g$ are computed according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

$$\vec{y}_g(t+1) = \underset{\vec{y}_i}{\operatorname{argmax}} J(\vec{y}_i(t+1)),$$

where $\vec{x}_i(t)$ is a position vector and $\vec{v}_i(t)$ is a velocity vector at an iteration t of an i-th agent, w is a momentum constant that prevents premature convergence of the agents, x is a constriction factor which influences the convergence of the agents, $c_0$ is a constant, $q_0(t)$ is a vector with the same dimension as $\vec{v}_i$ or $\vec{x}_i$ with a set of uniformly distributed random components in [−1.0, 1.0] drawn on each iteration, wherein the current best $y_i$ and the global best $y_g$ computed in the first phase are used as an initial current best $y_i$ and global best $y_g$ in the second phase;

wherein the first phase runs for a predetermined number of iterations prior to initiation of the second phase; and wherein the plurality of software agents converge at a position in the multi-dimensional solution space representing an optimum of the objective function, wherein the objective function is $j(\vec{y}_g)$.

16. The computer program product for particle swarm optimization as set forth in claim 15, wherein the velocity and position vectors for a particle i are updated according to the following:

$$\vec{v}_i(t+1) = w\vec{v}_i(t) + c_1 q_1[\vec{y}_i(t) - \vec{x}_i(t)] + c_2 q_2[\vec{y}_g(t) - \vec{x}_i(t)]$$
$$\vec{x}_i(t+1) = \vec{x}_i(t) + \chi\vec{v}_i(t+1),$$

wherein for $t \geq 1$, $y_i$ and $y_g$ are computed according to:

$$\vec{y}_i(t+1) = \begin{cases} \vec{x}_i(t+1), & \text{if } J(\vec{x}_i(t+1)) > J(\vec{y}_i(t)) \\ \vec{y}_i(t), & \text{otherwise} \end{cases}$$

$$\vec{y}_g(t+1) = \underset{\vec{y}_i}{\operatorname{argmax}} J(\vec{y}_i(t+1)),$$

where $\vec{x}_i(t)$ is a position vector and $\vec{v}_i(t)$ is a velocity vector at an iteration t of an i-th agent, $c_1$ and $c_2$ are each parameters that weight an influence of the current best solution $y_i$ and the current global best solution $y_g$, w is a momentum constant that prevents premature convergence of the agents, x is a constriction factor which influences the convergence of the agents, and $q_1$ and $q_2$ are each random variables that allow the agents to better explore the multi-dimensional solution space, which have the same dimensions as $\vec{v}_i$ or $\vec{x}_i$ and have uniformly distributed random components in the range of [−1.9, 1.0] drawn on each iteration.

17. The computer program product for particle swarm optimization as set forth in claim 16, wherein in the first phase, each agent undergoes a Brownian motion style random walk process.

18. The computer program product for particle swarm optimization as set forth in claim 17, wherein the first phase and the second phase can be repeated for multiple cycles as needed in order to prevent premature convergence on a non-optimum solution.

19. The computer program product for particle swarm optimization as set forth in claim 18, further comprising instruction means for causing a processor to perform an image registration such that during an image registration process, the position vectors of the plurality of software agents represent a set of candidate transformation parameters in the multi-dimensional solution space, wherein the multi-dimensional solution space is a transformation space, and wherein convergence of the plurality of software agents at the optimum of the objective function represents an alignment of a set of images.

20. The computer program product for particle swarm optimization as set forth in claim 18, wherein during an object recognition ion process, the plurality of software agents is used to find a location in an image which maximizes the objective function, wherein the optimum of the objective function is a confidence level of an object classifier.

21. The computer program product for particle swarm optimization as set forth in claim 18, wherein during an antenna beamforming process, the optimum of the objective function is a signal to noise ratio for a received signal, and wherein a set of solution parameters represent a set of weighting coefficients for elements of an antenna array.

* * * * *